United States Patent [19]

Gélinas et al.

[11] Patent Number: 5,108,766

[45] Date of Patent: Apr. 28, 1992

[54] FLAVORANTS FOR ENHANCING THE TASTE AND FLAVOR OF BAKERY PRODUCTS AND PROCESS OF MAKING

[76] Inventors: Pierre Gélinas, 874, Père-Albanel #4, Québec City, Québec, Canada, G2S 7W4; Odette Lachance, 2294, Laframboise #3, Saint-Hyacinthe, Québec, Canada, J2S 4X6; Johanne Audet, 4191, Du Moulin Est #45, Cap Rouge, Québec, Canada, G1Y-1L4

[21] Appl. No.: 600,706

[22] Filed: Oct. 22, 1990

[51] Int. Cl.$^5$ ............................ A23C 9/12; A23L 1/23
[52] U.S. Cl. ..................... 426/43; 426/533; 426/580; 426/583; 426/650
[58] Field of Search ............ 426/34, 37, 41, 42, 426/43, 533, 580, 583, 650

[56] References Cited

U.S. PATENT DOCUMENTS

| | | | |
|---|---|---|---|
| 3,404,984 | 10/1968 | Olsen | 426/533 |
| 3,615,697 | 10/1971 | Hollenbeck | 426/533 |
| 3,840,672 | 10/1974 | Kasik et al. | 426/533 |
| 4,001,437 | 1/1977 | Jaeggi et al. | 426/34 |
| 4,432,997 | 2/1984 | Reimerdes | 426/56 |

OTHER PUBLICATIONS

Elserrir, 1967, Cheesei Chemistry, Physics and Microbiology, vol. 2, Major Cheese Groups, Applied Science, London, pp. 45, 86, 87.

Law, 1984, Progress in Industrial Microbiology, "Microorganisms and their Enzymes", vol. 19: 245-283.
Coppola et al., 1988, The Microflora of Natural Whey Cultures, LeLait, vol. 68(3), 295-310.
Dellagio, F., 1988, Starters for Fermented Milks, Bulletin of the International Dairy Federation 227, 7-18.
Matz, 1987, Ingredients for Bakers, Pan-Tech International, McAllen, Tex., pp. 16, 111-112, 160-161.

*Primary Examiner*—Donald E. Czaja
*Assistant Examiner*—Helen Pratt
*Attorney, Agent, or Firm*—Larson and Taylor

[57] ABSTRACT

A process for producing bread flavorants is disclosed. The process starts with a mixture of milk and/or whey, water and optionally flour, sodium citrate, saccharose and yeast. The mixture is fermented at a temperature leading to the production of aroma substances and acids, typically in the 25°–45° C. range, using an inoculum which comprises at least one heterofermentative bacterial culture of Lactobacillus, e.g. *L. casei* subsp. *rhamnosus* and optionally one or more heterofermentative or homofermentative lactic bacterial cultures. These flavorants are added to bakery products at concentrations of about 2-4% (dry weight; flour basis) to enhance their flavor. At higher concentrations sourdough-type bread is obtained using a process substantially shorter than known processes. The resulting flavorant is stable when refrigerated and can be used in dried form.

12 Claims, No Drawings

FLAVORANTS FOR ENHANCING THE TASTE AND FLAVOR OF BAKERY PRODUCTS AND PROCESS OF MAKING

FIELD OF THE INVENTION

The invention relates to flavorants obtained from dairy products and useful for enhancing the flavor and taste of a variety of bakery products and their nutritional value, and to a process for producing such flavorants.

BACKGROUND OF THE INVENTION

Bread-making is a very old art. Over the centuries, a great number of techniques has been developed to impart a specific flavor and taste to the typical product of fermentation of flour mixed with water and certain yeast and bacteria. It has long been known, for example, to utilize the nutritional value and flavor qualities of milk in bread making processes.

Improving and enhancing the flavor of bakery products is still a great concern for cereal scientists. Bread processes have significantly shortened and fermentation times as well as mixing times are kept at minimum. Therefore, microorganisms involved in panary fermentation do not have time to produce much flavoring materials in dough. In recent years, some bread-making processes have undergone numerous changes to satisfy the consumer who is now more open to diversified products such as bagels, muffins and sourdough bread. The latter is a bakery product with a very unique flavor. The product is particularly popular in the San Francisco area. A traditional process of making sourdough bread consists of providing wheat flour (rye may be used) and varying proportions of water, and allowing the mixture to ferment at room temperature until optimum flavor and acidity develops. The "starter" mixture is reworked regularly by adding flour and water to ensure that it contains sufficient amounts of fermentable compounds. Fermentation can therefore take several days and the resulting leavening agent is incorporated into the dough in quantities varying from 15 to 80% on the basis of flour. This multistage process is still widely used today despite its deficiencies, i.e., duration, inconsistency of product quality and difficult process control.

A number of approaches have been proposed to modify the sourdough process, or, in general, to develop bakery products with different taste, or flavorants for the bread making process. Adding flavoring compounds (commercial bases) to the dough is one strategy employed to reduce fermentation time (Ziemke and Glabe, U.S. Pat. No. 4,034,125). The latter proposal serves to reduce the production time and assure better control over the finished product, the trade-off being the taste of bread produced in this fashion. Kline (U.S. Pat. No. 4,140,800) proposes to use a freeze-dried culture of lactobacilli (*L. sanfrancisco*) to better control sourdough production and to reduce sourdough preparation time to approximately 18 to 10 hours. Others have tried to imitate the sourdough process by adding acid whey power and vinegar to the dough (Shenkenberg, et al., 1972, Food Prod. Dev. 6(1), 29–30, 32). Another means of enhancing the flavor of bread is to use 4–6% (flour basis) non-fat milk solids (NFMS) during bread-making. To cut costs, NFMS may be replaced, at least in part, with whey powder which is less expensive and also improves to some extent the color, aroma and taste of the finished product.

Jaeggi, et al., U.S. Pat. No. 4,001,437, propose to manufacture aroma substances, or flavorants, by heating a liquid product, obtained from carbohydrate-containing milk products by enzymatic proteolysis and/or by lactic acid fermentation. The final product has a bread-crust flavor reminiscent of roasted cheese.

Hill, U.S. Pat. No. 3,846,561, incorporates yogurt in the dough from which baked products are prepared.

Jaeggi and Hill processes involve bacteria of the genera Lactobacillus or Streptococcus. For yoghurt (Hill process), *Lactobacillus delbrueckii* subsp. bulgaricus and *Streptococcus thermophilus* are the specific bacteria to be used.

STATEMENT OF THE INVENTION

While fermentation of milk by lactic acid producing bacteria ("lactic bacteria") gives a known product with a light flavor, the present invention aims at developing concentrated flavorants to be primarily used as ingredients for making bakery products.

It is another object of the invention to provide a process for producing a flavor concentrate using selected bacteria.

It is a further object of the present invention to provide a process for producing a flavor concentrate useful to prepare a bread of the sourdough type.

According to the invention, there is provided a process for preparing a flavorant, or flavor ingredient useful to enhance the taste and/or flavor of bakery products.

The process comprises:
a) providing a mixture containing
  a member selected from the group consisting of skimmed milk, whole milk, whey and other milk derivatives,
  water, and
  an inoculum comprising at least one heterofermentative bacteria culture of the genus Lactobacillus, and
b) fermenting the mixture at a temperature in the range 15°–50° C., preferably 25°–45° C. for a period of time sufficent for the bacteria to produce a satisfactory range of concentrated flavor compounds and acids in the mixture virtually free of off-flavors.

Tests have indicated that heterofermentative Lactobacillus cultures meet the object of this invention, for example the following facultative heterofermentative bacteria:

*L. casei* subsp. casei
*L. casei* subsp. rhamnosus
*L. casei* subsp. tolerans and the following obligatory heterofermentative bacteria:

*L. brevis*
*L. fermentum*
*L. kefir*

Optionally, the inoculum may also comprise one or more lactic bacteria cultures, particularly those selected from the following:

heretofermentative mesophilic bacteria—*Leuconostoc cremoris*
homofermentative mesophilic bacteria—*Streptococcus lactis*—*Streptococcus diacetylactis* and—*Streptococcus cremoris*,
and homofermentative thermophillic bacteriaa mixture of *Lactobacillus delbrueckii* subsp. *bulgaricus* and *Streptococcus thermophilus*, or a mixture of *Lactobacillus helveticus* with *Streptococcus thermophilus*.

The inoculum is added to the mixture in an amount ranging from about 1.0% to about 3.0% by volume of the mixture (about $1-5 \times 10^8$ cells/g dairy solution).

The term "heterofermentative" as used herein denotes bacterial cultures which are capable of producing a broad range of aromas and flavors as opposed to "homofermentative bacteria" which are capable of producing almost exclusively lactic acid from milk or whey.

The temperature of fermentation is seclected to foster an optimum combination of acids and aromas. The temperature does not have to be constant throughout the fermentation. For thermophilic bacteria, incubation at 42° C. is known to be conducive to increased acid production while production of aromas is favoured at 38° C. For mesophiles, temperature about 29° C. is conducive to acid production, while fermentation at about 24° C. yields more aromatic compounds and far less acids. Preferably, the fermentation mixture may also comprise flour, sodium citrate, yeast and saccharose, the effect of each of these ingredients and their content being discussed hereinbelow.

DETAILED DESCRIPTION OF THE INVENTION

Substrate

Milk powder ("high heat") is the preferred substrate for producing the flavorant. However, environmental and economic considerations dictate the substitution of up to 50% of the milk powder by sweet whey powder. It has been found in the course of experiments that such a substitution does not significantly affect the taste of the flavorant while ensuring optimal organoleptic qualities of the baked goods made with the use of the flavorant.

The milk/whey powder is thoroughly mixed with water before incubation. The optimum concentration of the powder in the mixture has been found to be about 15-°% w/v.

Flour

The mixture may be enriched by adding flour, e.g., wheat flour. This additive is not mandatory but it yields a higher degree of acidity in the flavorant. The flour content may be quite substantial but it is not recommended to add more than ca. 35% w/v (35 g per 100 ml of the mixture), otherwise the viscosity of the mixture is increased excessively thus making its use more difficult. The flour may help fix the flavors during the drying process. It should also be noted that the higher the flour extraction rate (100% corresponds to whole flour), the greater the buffer effect and the greater the acidity of the final product (flavorant). Whole wheat flour, for instance, offers a more complete medium for the cultures. The use of 10% whole wheat flour (w/v) in the dairy solution is considered a good choice (Table 1).

Even if wheat flour is a normal choice, other types of flour may be used, in combination or not. The use of a specific type of flour further affects the flavor of the fermented dairy ingredient. The most interesting flavorants were obtained by using the following flours: whole wheat, rye, barley, buckwheat, wheat (white flour), corn and oat. Soya flour led to off-flavors even if it acted as a very good buffer. Flavorants made with rice, arrow-root or millet were the least interesting. One of the main characteristics of this invention is to permit as much acidification of the dairy medium as possible without producing off-flavors. The use of a particular flour type may act as a buffer to permit higher acidification and aroma compounds production considering that it modifies the nutritional composition of the growth medium. Table 2 presents flavorant characteristics and bread produced according to flour type in growth medium.

It must be considered that flour contains microorganisms (mainly lactic bacteria and yeast) that significantly contribute to flavor production in the fermentation medium. The flavor of the flour itself affects the flavor of the resulting bread.

TABLE 1

Effect of wheat flour content in growth medium on pH and titratable acidity of flavorant*

| Flour concentration (%, w/v) | pH | Titratable acidity (%) |
|---|---|---|
| 0 | 4.43 | 1.59 |
| 10 | 4.05 | 2.28 |
| 20 | 3.98 | 2.36 |
| 30 | 3.97 | 2.36 |
| 40 | 3.97 | 2.27 |
| 30 - whole wheat | 3.94 | 2.67 |
| 40 - whole wheat | 3.93 | 2.66 |

*Fermentation performed with *Lactobacillus casei* subsp. *rhamnosus* for 24 hours at 38° C. in a 50/50 milk-whey solution.

TABLE 2

Flavorant pH and acidity depending on the type of flour in growth medium, and the properties of the resulting bread

| | FLAVORANT | | | BREAD | | | | |
|---|---|---|---|---|---|---|---|---|
| Flour | pH | TTA (%) | TTA ($\times 10^{-2}$ meq/g) | pH | TTA ($\times 10^{-2}$ meq/g) | Proof Time (min) | Specific Volume (cm³/g) | Organoleptic Quality (flavor) |
| Soya | 4.18 | 3.30 | 36.7 | 4.64 | 5.43 | 51 | 3.82 | •Poor (off-flavors) |
| Whole Wheat | 3.95 | 3.07 | 34.1 | 4.69 | 4.62 | 49 | 4.06 | •Interesting |
| Rye | 4.00 | 2.57 | 28.6 | 4.57 | 4.95 | 46 | 4.11 | •Interesting |
| Barley | 4.03 | 2.55 | 28.4 | 4.58 | 4.95 | 47 | 4.04 | •Interesting |
| Buckwheat | 4.16 | 2.53 | 28.1 | 4.72 | 4.62 | 45 | 4.33 | •Interesting |
| Wheat (white flour) | 4.06 | 2.25 | 25.1 | 4.74 | 4.18 | 48 | 4.18 | •Interesting |
| White rice | 4.27 | 2.22 | 24.7 | 4.83 | 4.07 | 45 | 4.35 | •Flat (insipid) |
| Maize | 4.20 | 2.19 | 24.3 | 4.80 | 4.22 | 46 | 4.10 | •Interesting |
| Oats | 4.38 | 2.19 | 24.3 | 4.84 | 4.26 | 45 | 4.29 | •Interesting |
| Arrow-root | 4.49 | 1.31 | 16.0 | 5.01 | 3.15 | 48 | 4.29 | •Poor (off-flavors) |

TABLE 2-continued

Flavorant pH and acidity depending on the type of flour in growth medium, and the properties of the resulting bread

| | FLAVORANT | | | BREAD | | | | |
|---|---|---|---|---|---|---|---|---|
| Flour | pH | TTA (%) | TTA ($\times 10^{-2}$ meq/g) | pH | TTA ($\times 10^{-2}$ meq/g) | Proof Time (min) | Specific Volume (cm$^3$/g) | Organoleptic Quality (flavor) |
| Millet | 5.24 | 1.17 | 14.3 | 5.31 | 2.71 | 50 | 4.92 | •Poor (off-flavors) |

Inoculum

As mentioned hereinabove, the type of bacterial culture(s) used in the process is essential since it influences the type and variety of flavors generated. It is important to use a heterofermentative bacterial culture as the basic one i.e. contributing more viable cells than about 50% of the total cells in the inoculum, so that a relatively broad flavor range is produced. In tests, all the heterofermentative lactobacilli listed hereinabove (statement of the invention) gave close results in terms of flavor-/aroma. These Lactobacillus species may be used in combination with one or more of the following mesophilic cultures:

a) *leuconostoc cremoris* (heterofermentative), *Streptococcus lactis* (homofermentative), *Streptococcus diacetylactis* (homofermentative) and *Streptococcus cremoris* (homofermentative)

in undefined proportions, or, for example, the following thermophilic cultures, b) *Lactobacillus delbrueckii* subsp. bulgaricus mixed with *Streptococcus thermophilus* (both homofermentatives) in the ratio about 1:10, or c) *Lactobacillus helveticus* and *Streptococcus thermophilus* in a 2:1 mixture, both homofermentatives and good acidity producers.

The cultures of group a) produce substantial amounts of flavor compounds but very little acidity. The cultures b) produce a great deal of titratable acidity but may result in a more bitter flavor in bread, probably because of the byproducts of proteolysis.

Inoculum is usually applied in a freeze-dried form. A sample of inoculum is taken aseptically from the batch and added to the fermentation mixture. The amount of inoculum added may be in the range of 1-30% by volume of the liquid fermentation mixture; the optimum content, in respect of the acidity produced, has been found to be about 2.5% w/v. Instead of using a freeze-dried culture, a fresh lactic culture can also be prepared and kept in a cool place.

When a mixed culture is used, it is important to consider the number of viable cells per gram of freeze-dried culture. For instance, for a mixture of 50% w/w of *L. casei* var rhamnosus and a mixed thermophilic culture (*L. helveticus* and *S. thermophilus*), the number of viable cells per g was respectively $23 \times 10^9$, $9 \times 10^8$ and $1 \times 10^9$. This means that 92.6% of the viable microorganisms were provided by *L. casei*, 3.5% by *L. helveticus* and 3.9% by *S. thermophilus*.

Sodium citrate

The use of citrate not only influences the system's balance but also the production of flavor compounds. Indeed, certain bacteria, particularly the heterofermentative mesophiles (e.g. Leuconostoc) metabolize citrate to produce diacetyl. There is a relationship between diacetyl production and the acidity of the medium. The concentration of diacetyl reaches a maximum when all the citrate is fermented and the pH is acidic (pH under 4.6), thus promoting the activity of the citrate permease.

In our tests, the sodium citrate was added in the amount of max. about 1% (w/v). Beyond this level, extra amounts of citrate cause a drop in the acidity of the fermentation product. It is possible that the concentration $CO_2$ is a factor in inhibiting the growth of the bacteria.

Yeast

Originally, the microbial flora in sourdough breads consisted of acid tolerant "wild" yeasts and lactic bacteria which fostered optimum production of acids and flavor compounds. The optional addition of baker's yeast (*Saccharomyces cerevisiae*) to the medium could enhance some interactions with the lactic bacteria present, especially with regard to the development of flavors. The optimum quantity of yeast to be incorporated into the medium has been found to be about 0.25% (w/v). A larger content could give the eventual baked goods (prepared with the flavorant) an aftertaste.

Saccharose

The optional addition of saccharose to the culture medium introduces a source of sugar that can be directly assimilated by the yeasts and thus increases yeast activity to augment production of flavors. The optimum addition is in the range of 1-3%, flour basis.

Mixing

Mixing of the fermentation medium is necessary to ensure the homogeneity of the mixture and the fermentation product as well as to avoid the formation of gel. Agitation also promotes the incorporation of air which affects the metabolism of lactic bacteria, possibly leading to production of formate, acetate, ethanol and diacetyl in addition to lactate.

Agitation speed also influences the production of acid. In fact, acid production diminishes when agitation increases from 140 to 200 cycles/min for some cultures. Too much oxygen in the medium may also cause an imbalance in the production of different aromatic compounds and acids. Therefore, agitation should be kept to a minimum which is sufficient to ensure homogeneity of the medium.

End of Fermentation

The fermentation can be stopped at any time after sufficient amounts of aromatic substances and acids have been produced by the bacterial cultures of the inoculum. Best results were obtained after about 24 hours, with all the tested cultures. However, fermentation for about 6-12 hours yields a less acidic and concentrated product, ready-to-eat, with a very pleasant flavor, much distinct from yoghurt. Fermentation can be terminated simply by lowering the temperature of the fermentation mixture to below ca. 10° C., followed optionally by the lyophilization (freeze-drying) of the product for longer storage. It is important to note that even in the liquid form, the product has a shelf-life of two weeks or more.

EXAMPLE 1

Preparation of Flavorant

In 1000 ml water was dissolved 100 g of skimmed milk powder (high heat) and 100 g of sweet whey powder. The ingredients were mixed until dissolved, smoothly blended, and pasteurized (80° C.; 30 min), whereupon the following ingredients were added:
346.5 g flour
2.9 g instant dry yeast
11.6 g sodium citrate
11.6 g sucrose These ingredients were mixed in until dissolved. The temperature of the mixture was then adjusted to a desired temperature suitable for the bacterial culture chosen. The mixture was then inoculated with 28.9 g of a freeze-dried culture selected from those listed in Table 3. The mixture was incubated for 24 hours under gentle agitation. After that period, the flavorant was placed at 4° C.

The resulting fermented flavorant mixture undergoes separation after a few days, especially if flour has been added. When frozen, the flavorant keeps for several months without a change in its texture or color. After defrosting, it will keep for two weeks in the refrigerator just like the fresh product. The flavorant may be freeze-dried or dried to increase its shelf life considerably, with no significant loss of flavor.

TABLE 3

Exemplary fermentation cultures and the incubation temperatures.

| Microorganisms | Inoculum Ratio % (w/w) | Temperature °C. |
|---|---|---|
| L. casei subsp. rhamnosus or L. brevis | 100 | 38 |
| L. casei subsp. rhamnosus | 75 | 38 |
| L. helveticus + S. thermophilus | 25 | |
| L. casei subsp. rhamnosus | 50 | 38 |
| L. helveticus + S. thermophilus | 50 | |
| L. casei subsp. rhamnosus | 50 | 42 |
| L. helveticus + S. thermophilus | 50 | |

EXAMPLE 2

Preparation of Flavorant (Simplified Process)

In 1000 ml of water was dissolved 100 g of skimmed milk powder (high heat) and 100 g of sweet whey powder (see Example 1). After pasteurization and cooling at 38° C., 100 g of flour and 28.9 g of a freeze-dried culture of *Lactobacillus casei* subsp. rhamnosus were added. Fermentation lasted 24 hours. The flavorant was freeze-dried and kept at room temperature.

EXAMPLE 3

The procedure is the same as in EXAMPLE 2 except that the fermentation was stopped after 6-12 hours. It yields a less concentrated fermented dairy product which can be used as a flavorant or eaten as such. This fermented dairy product tastes somewhat like a yoghurt but its flavor is less acidic and it is considered more aromatic.

EXAMPLE 4

Preparation of Bread by the "No-Time Dough" Process

For the "no-time dough" process, a flavorant was prepared as in Example 1. The flavorant contained about 30% w/v of flour. A bread recipe was set up as shown in Table 4.

TABLE 4

Bread recipe for "no-time dough" process.

| Ingredient | Preparation |
|---|---|
| Flour | 100 |
| Water | variable |
| Fresh yeast | 3 |
| Shortening | 3 |
| Sugar | 4 |
| Salt | 2 |
| Potassium bromate | 60 ppm |
| Ascorbic acid | 100 ppm |
| Freeze-dried flavorant | 2-6 |

The dough was subjected to the following operations: mixing (1 min at low speed and 12 min at high speed; division; rounding; retention for 10 min; sheeting; moulding; proofing at 40° C. and 95% R.H. until the dough rises 2.5 cm over the rim; and baking for 20 min at 213° C.

The resulting bread has an enhanced flavor, slightly acid and riminiscent of a specialty cheese.

In this example, freeze-dried flavorant is used. It is also possible to use the liquid form instead, adjusting the amounts accordingly. For example, 2-6% parts per 100 parts of flour (Table 4) would correspond to 5.2-15.6 parts of liquid flavorant (containing 30% flour) per 100 parts of flour. It is important to make a correction for the amount of water incorporated into the dough with the liquid flavorant.

EXAMPLE 5

Production of a More Piquant Bread of the Sourdough Type

The recipe is the same as in Example 2 except that the quantity of the flavorant, in the freeze-dried form is greater, ranging from 6 to 20% (on the basis of flour), for example 11.5 g per 100 g flour, which is equivalent to 30 g of liquid flavorant. The flavor obtained is close to that of typical sourdough bread. The advantage in employing the flavorant is the shortening of the bread-making procedure to a minimum (3 hours compared to 24-48 hours or more) and the uniformity of flavor and taste from batch to batch.

EXAMPLE 6

The procedure was the same as in Example 5 except that whole wheat flour is used. The flavor obtained is typical of a sourdough bread containing whole wheat flour.

EXAMPLE 7

The flavorant described in Example 1 was used in a sponge and dough process:

| Sponge | Weight (g) |
|---|---|
| Whole wheat flour | 1000 |
| Water | 600 |
| Yeast | 30 |

After mixing, fermentation is done 25° C. for 4.5 hours.

| Dough | |
|---|---|
| Whole wheat flour | 500 |
| Liquid flavorant (38.5% solids) | 234 |
| Water | 200 |
| Gluten | 90 |
| Salt | 30 |

After mixing for 12 min, dough was divided and processed as in Example 3. The resulting bread has a delicate flavor, a bit acidulated and very tasty, as described by panel.

We claim:

1. A process for preparing a fermented dairy product useful to enhance the flavor and/or taste of bakery products, the process comprising:
   a) providing a mixture containing: a member selected from the group consisting of skimmed milk, whole milk whey, and combinations of milk and whey, water, and an inoculum comprising a heterofermentative bacterial culture of the genus Lactobacillus, wherein the number of viable cells of the heterofermentative Lactobacillus culture is at least 50% of the total number of bacterial cells in the inoculum, and
   b) fermenting the mixture at a temperature in the range 15°-50° C., for a period of time sufficient for the bacteria to produce a satisfactory range of flavor compounds and acids in the mixture, virtually free of off-flavors.

2. The process according to claim 1 wherein the inoculum comprises one or more of the following heterofermentative bacteria: facultative—*L. casei* subsp. *casei*, *L. casei* subsp. *rhamnosus*, *L. casei* subsp. *tolerans*, and obligatory—*L. brevis*, *L. fermentum* and *L. kefir*.

3. The process according to claim 2 wherein the inoculum further comprises one or more of the following lactic bacterial cultures: *Leuconostoc cremoris*, *Streptococcus lactis*, *Streptococcus diacetylactis*, *Streptococcus cremoris*, a mixed culture of *Lactobacillus delbrueckii* subsp. *bulgaricus* and *Streptococcus thermophilus* and a mixed culture of *Lactobacillus helveticus* and *Steptococcus thermophilus* wherein the number of viable cells of the heterofermentative Lactobacillus culture is at least 50% of the total number of bacterial cells in the inoculum.

4. The process according to claim 1 wherein the mixture is subjected to mild agitation during the fermentation.

5. The process according to claim 1 wherein the inoculum is added to the mixture in an amount ranging from about 1.0% to about 3.0% by volume of the mixture.

6. The process according to claim 1 wherein the mixture also includes up to about 35 wt. % of flour based on the volume of the mixture.

7. The process according to claim 1 wherein the mixture also includes about 0.25 wt. % yeast based on the volume of the mixture.

8. The process according to claim 6 wherein the mixture also includes about 1-3 wt. % saccharose based on the flour content.

9. The process according to claim 1 wherein the temperature of fermentation is in the range of 25°-45° C.

10. The process according to claim 1 wherein the content of skimmed milk, whole milk, whey or combinations of milk and whey is 150-200 g of dry matter per 1 liter of the mixture.

11. A fermented dairy product obtained by the process of claim 1 which contains a mixture of aromatic compounds and acids.

12. A fermented dairy product obtained by the process of claim 1 which is added to a bakery recipe to impart an enhanced flavor to the resulting bakery product, namely a slight acid and a cheese-like flavor.

* * * * *